United States Patent

Hannemann et al.

[11] Patent Number: 5,360,455
[45] Date of Patent: Nov. 1, 1994

[54] PROCESS FOR PRODUCING MULTICOLOR OR TONE-IN-TONE EFFECTS

[75] Inventors: Klaus Hannemann, Lörrach, Germany; Alfred Höhener, Magden, Switzerland; Huanzhong Wang, Basel, Switzerland; Manfred Rembold, Aesch, Switzerland

[73] Assignee: Ciba-Geigy Corporation, Ardsley, N.Y.

[21] Appl. No.: 25,212

[22] Filed: Feb. 26, 1993

[30] Foreign Application Priority Data

Mar. 3, 1992 [CH] Switzerland .............. 650/92-5

[51] Int. Cl.⁵ .............. D06P 5/20; D06P 5/12
[52] U.S. Cl. .............. 8/444; 8/446; 8/917; 8/924; 8/115.52
[58] Field of Search .............. 8/115.52, 444, 446, 8/917, 924, 925; 427/538

[56] References Cited

U.S. PATENT DOCUMENTS

| | | | |
|---|---|---|---|
| 4,400,424 | 8/1983 | Hatada et al. | 428/212 |
| 4,507,539 | 3/1985 | Sando et al. | 219/121 |
| 4,522,873 | 6/1985 | Akagi et al. | 428/283 |
| 4,601,911 | 7/1986 | Ueno et al. | 427/34 |
| 4,997,519 | 3/1991 | Kondo et al. | 156/643 |

FOREIGN PATENT DOCUMENTS

| | | | |
|---|---|---|---|
| 2237485 | 2/1974 | Germany . | |
| 59-47473 | 3/1984 | Japan | D06M 10/00 |
| 61-146871 | 7/1986 | Japan | D06M 13/00 |
| 62-33892 | 2/1987 | Japan . | |
| 62-283133 | 12/1987 | Japan | C08J 7/00 |
| 314676 | 1/1991 | Japan | D06M 15/00 |

OTHER PUBLICATIONS

Derwent Abst 91-060998 (of JP 03,008,815) 1991.
Derwent Abst 87-105595 (of JP 62-053,486), 1987.
Chem. Abst 107: 60549, 1987 * no month abailable.
Derw. Abst. 21995x/12 (of JP 76/005,869) Feb. 1976.
Chem. Abst. 11726v/07 of DE 2,237,485 Feb. 1974.
Chem. Abst. 114: 249194q.
Derw. Abst. 87-105595 of JP 850188517 Aug. 1988.
Chem. Abst. 111 (12): 98856s 1988.
Derw. Abst. 90-227022/30 of Japanese Patent 2154075, Jun. 1990.

*Primary Examiner*—Paul Lieberman
*Assistant Examiner*—Margaret Einsmann
*Attorney, Agent, or Firm*—Kevin T. Mansfield; George R. Dohmann

[57] ABSTRACT

There is disclosed a process for producing multicolor or tone-in-tone effects on natural and synthetic polyamide fiber material by subjecting flocks, slubbing, yarn or selected areas of piece goods to a plasma or corona discharge treatment before dyeing and subsequently dyeing the pretreated material with an anionic dye.

Dyeings with very good differentiation of depth of shade on homogeneous polyamide fiber material are obtained by the process of this invention without the addition of resist agents or levelling agents.

19 Claims, No Drawings

PROCESS FOR PRODUCING MULTICOLOR OR TONE-IN-TONE EFFECTS

The present invention relates to a process for producing multicolour or tone-in-tone effects on natural and synthetic polyamide fibre material by subjecting said fibre material to a plasma or corona discharge pretreatment.

The one-bath method of producing multicolour or tone-in-tone effects has been decisively influenced by the development of so-called differential dyeing fibres, i.e. fibres of the same chemical origin but, on account of their chemical modification, having different affinity for dyes. The different affinity can be achieved by modified subtypes of polyamide fibres that differ in the number of amino end groups and which can therefore be dyed to different depths of shade.

Another means of producing a multicolour effect consists in pretreating first selected areas of polyamide piece goods with a resist agent, fixing said resist agent and subsequently dyeing the substrate with one or more than one anionic dye which then reacts to a greater degree with those areas of the substrate that have not been treated with the resist agent. In this manner it is possible to obtain a sample of dyed, less dyed and undyed areas.

It has now been found that the use of differential dyeing fibres or a wet chemical pretreatment with a resist agent can be dispensed with by subjecting flocks, slubbing, yarn or selected areas of piece goods to a plasma or corona discharge treatment before dyeing.

Accordingly, the invention relates to a process for producing multicolour or tone-in-tone effects on natural and synthetic polyamide fibre material by subjecting flocks, slubbing, yarn or selected areas of piece goods to a plasma or corona discharge treatment before the dyeing process and subsequently dyeing the pretreated material with an anionic dye.

To produce the multicolour effect, specific areas of the dry untreated textile material is covered with adhesive tape or a screen with the desired pattern. The substrate is thus prepared for the low temperature or corona discharge pretreatment.

Defined images on the substrate can also be produced by selective electromagnetic control of the plasma beam.

The principles of gas discharge and, in particular, of plasma chemistry are known and described, inter alia, by A. T. Bell, "Fundamentals of Plasma Chemistry" in "Technology and Application of Plasma Chemistry", ed. J. R. Hollahan and A. T. Bell, Wiley, New York (1974) or H. Suhr, Plasma Chem. Plasma Process. 3(1), 1, (1983).

Basic information on the corona treatment in dyeing and finishing processes will be found e.g. in COATING 7/90 or Textilbetrieb 5/82.

Suitable gases for the low temperature plasma pretreatment are, on the one hand, non-polymerisable gases, i.e. gases that do not polymerise per se under plasma conditions and which do not produce troublesome polymer film, or gases that impart hydrophobic, properties to the fibre material to be treated. Non polymerisable gases are for example oxygen, nitrogen, argon, helium, hydrogen, ammonia, carbon dioxide and a mixture of such gases. Typical examples of non-polymerisable gases are oxygen, nitrogen or argon, or air in the form of a mixture of gases. Gases that impart hydrophobic properties are typically fluorinated hydrocarbons or mixtures of hydrocarbons and fluorinated hydrocarbons, for example mixtures of methane or ethane with $CF_4$ or $C_2F_6$ that can be vaporised under the pressure conditions of a plasma discharge. Exemplary of fluorinated hydrocarbons are typically $CF_4$, $C_2F_6$, $C_3F_8$ or $C_4F_8$. It is preferred to use $CF_4$ or $C_2F_6$.

The plasma pretreatment is carried out in a plasma reactor. The construction and assembly of such a reactor is known per se. For the process of this invention it is preferred to use a reactor which is equipped with two parallel electrodes (parallel plate reactor). Also suitable for use, however, are the larger units with smaller discharge electrodes that are also used for the corona treatment. For the plasma pretreatment, the prepared substrate is placed into a plasma reactor. The fabric to be treated is placed between the two electrodes. The electrodes are spaced 1 to 30 cm, preferably 2 to 10 cm, apart. After placing the textile fabric into the reactor, this latter is evacuated by means of a mechanical vacuum pump. In continuous operation (for example with rolled up fabric webs), special vacuum ports are provided so that the goods can be introduced and, upon completion of the pretreatment, guided out again without difficulty. Afterwards the gas or gas mixture is passed into the reactor while adjusting the flow to a predefined flow rate which is in the range from 0.1 to 500, preferably from 1 to 200 sccm/min. Under the influence of the continuous vacuum treatment the gas flows through the reactor. The pressure in the reactor is from $10^{-4}$ to 10 mbar, preferably from $10^{-2}$ to 1 mbar. The actual plasma is generated by applying a variable current at the electrodes. A direct current (DC) or alternating current (AC) can be applied at the electrodes, and frequencies of 1 kHz to 3 GHz can be generated by a transmitter. It is preferred to use frequencies of 1 kHz to 120 kHz, 13.56 MHz, 27.12 MHz or 2.45 GHz. Together with the gas a glow discharge is generated in the reactor to produce energy-rich ions, electrons as well as highly reactive neutral molecules or radicals which interact with the surface of the textile fabric. The electric power can also be varied and is from 1 to 100 kilowatt, preferably from 1 to 300 watt. The treatment time, i.e. the actual time during which the fibre material is exposed to the plasma, is from 0.1 second to 10 minutes, preferably from 1 to 120 seconds.

The low temperature plasma pretreatment is preferably carded out under the following conditions:
(a) gas:
  ($a_1$) non-polymerising gas: oxygen, nitrogen or argon,
  ($a_2$) gas that imparts hydrophobic properties: $CH_4$, $CF_4$, $C_2F_6$ or mixtures of these gases
(b) electrode spacing: 2 to 10 cm,
(c) flow rate: 1 to 200 sccm/min
(d) pressure: $10^{-2}$ mbar to 1 mbar,
(e) transmitter frequency: 1 kHz to 3 GHz, preferably 1 kHz to 30 MHz
(f) electric power: 50 W to 2 kW and
(g) treatment time: 1 to 120 seconds.

An apparatus consisting of a high-performance generator and an electrode system is used for the corona treatment. Suitable generators are typically those that produce a sinusoidal alternating voltage of 1 to 20 kV with a frequency of 10 to 40 kHz. The electrode system consists of a discharge electrode at which the high voltage is applied and a roller for the substrate which is connected as electrically earthed counter-electrode.

The two electrodes are spaced only a few millimeters apart. After applying the voltage, the fibre material is transported through this space. The corona discharge is normally carded out in ambient air under atmospheric pressure. In order to induce a specific surface energy on the fibre material, a specific dose of energy must be applied to one surface element of the fibre material to be treated. This so-called "corona dose" [W. min/cm$^2$] is defined as follows:

$$\text{dose } (D) = \frac{\text{generator power } (P)}{\text{corona width } (CW) \times \text{web speed } (V)}$$

The corona dose is from 100 to 3000, preferably from 400 to 1000 W.min/cm$^2$.

The actual dyeing process is carded out after the plasma and corona discharge treatment.

Suitable dyes are acid or metal complex dyes, typically 1:2 chromium, 1:2 cobalt or copper complex dyes, and also disperse or reactive dyes. It is also possible to use mixtures of dyes to produce bichromatic or trichromatic dyeings.

Examples of such dyes are listed in the Colour Index, 3rd Edition, 1971, Vol. 4.

Reactive dyes will be understood as meaning those dyes that are listed in the Colour Index, 3rd Edition, 1971 as reactive dyes. They are dyes which contain at least one reactive group that reacts with polyhydroxyl fibres (cellulosic fibres) or with polyamide fibres, preferably wool, a precursor of such a group or a substituent that is capable of reacting with polyhydroxyl fibres or with polyamide fibres.

Dyeing is carried out by the exhaust process. The mount of dye added to the dye liquor will depend on the desired tinctorial strength. In general, amounts of 0.01 to 10 percent by weight, preferably 0.01 to 2 percent by weight, based on the fibre material, have been found useful.

The liquor to goods ratio may vary over a wide range, typically from 1:3 to 1:100, preferably from 1:8 to 1:30.

In addition to the dyes, the dyebaths may contain mineral acids such as sulfuric acid or phosphoric acid, organic acids, preferably aliphatic carboxylic acids such as formic acid, acetic acid, oxalic acid or citric acid and/or salts such as ammonium acetate, ammonium sulfate or sodium acetate. The acids are added to adjust the pH of the liquors used in the process of this invention to the range from 2 to 7.

It is not necessary to add any further ingredients such as resist agents and/or levelling agents to the dyebath.

Likewise, no special apparatus is required for carrying out the dyeing process. Standard dyeing machines such as open baths, machines for dyeing tops, hanks or wound packages, jiggers, paddle machines, beam dyeing machines, circulation or jet dyeing machines or winchbecks can be used.

Dyeing is conveniently carded out in the temperature range from 60° to 120° C., preferably from 70° to 105° C. The dyeing time is within the usual limits and is normally from 10 to 120 minutes.

Upon termination of dyeing, the dyeing process may be followed by an alkaline aftertreatment with, typically, aqueous ammonia, an alkali metal hydroxide, an alkali metal carbonate or hydrogencarbonate or hexamethylenetetramine. The pH of the alkali-containing dyebath is conveniently in the range from 7.5 to 9, preferably from 8 to 8.5.

The dyeing of the fibre material which has been subjected to a plasma- or corona-pretreatment is conveniently carded out by briefly treating the goods to be dyed with an aqueous liquor that contains the dye and the acid. The temperature is then slowly raised to carry out dyeing in the temperature range from 70° to 105° C. and for 10 to 90 minutes, preferably for 30 to 60 minutes. If required, the dyed goods are subsequently treated for 10 to 20 minutes at 70°–90° C. after addition of alkali, preferably sodium hydrogencarbonate or sodium carbonate. Finally, the dyed material is removed from the bath and washed off, acidified and dried in conventional manner.

Suitable fibre material that can be pretreated and subsequently dyed by the process of this invention is natural or synthetic polyamide. The synthetic polyamide fibre material is suitably polyamide 6, polyamide 66 or polyamide 12. In addition to pure polyamide fibres, blends of polyamide and polyurethane are also especially suitable, typically polyamide/polyurethane material in the ratio 70:30, preferably in the form of microfibres. Natural polyamide is suitably wool or wool/polyacrylonitrile, wool/polyester or wool/cotton blends.

Quite generally the pure or blended polyamide fibre material may be in any form of presentation, typically fibres, fleece, flocks, yam, woven and knitted materials, slubbing, knitgoods or pile goods.

Dyeings with very good differentiation of depth of shade on homogeneous polyamide fibre material are obtained by the process of this invention without the addition of resist agents or levelling agents. The multicolour effect can be controlled in simple manner by varying the plasma or corona discharge parameters. In addition, by dispensing with wet chemical dyeing assistants such as levelling or resist agents no wastewater problems occur. The plasma pretreatment is a "dry" process in which no waste products are formed. The present process thus also has environmental advantages. Chlorination of wool can also be dispensed with, as the wool treated by the inventive process is simultaneously rendered shrink-proof.

The invention is illustrated by the following Examples in which parts and percentages are by weight.

EXAMPLE 1

Selected areas of a woollen fabric are covered with adhesive tape. The fabric is then subjected to a plasma pretreatment under the following conditions:
frequency: 13.56 MHz
power: 250 Watt
pressure: 0.1 mbar
gas: oxygen
flow rate: 10 sccrn/min
electrode spacing: 3 cm
treatment time: 90 seconds After the treatment, the adhesive tape is removed and the fabric is dyed by a standard dyeing process without the addition of a levelling agent. The dyebath contains:
1.5% of the dye of formula

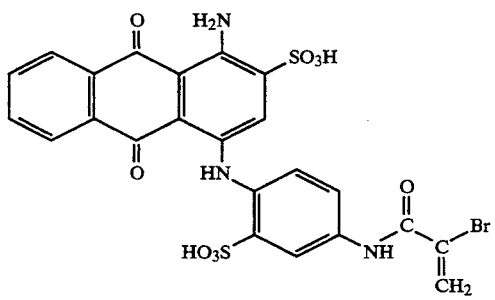

and 1 g/l of sodium acetate.

The pH is adjusted with acetic acid (80 %) to 4.6. The dyebath is heated to boiling temperature at a heating up rate of 1° C./min and dyeing is carded out at this temperature for 60 minutes. The dyeing is finished in conventional manner. The areas pretreated by the plasma are strongly dyed, whereas the areas covered with the adhesive tape are almost colourless.

EXAMPLE 2

5 g of untreated wool yarn and 5 g of wool yarn which have been subjected to a plasma pretreatment under the conditions described in Example 1 are treated together in the same dyebath which contains 150 mg of the dye of formula

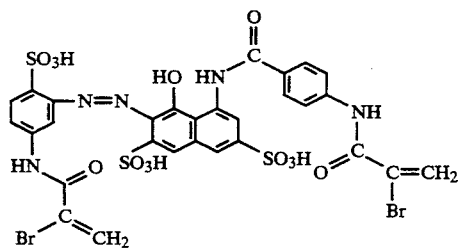

400 mg of sodium acetate and
400 ml of water.

The pH is adjusted with acetic acid (80 %) to 4.5. Dyeing is carded out as described in Example 1 to give yarns which are dyed in different depths of shade. The effect can be further enhanced by using instead of the untreated wool a yarn which has been pretreated with a plasma prepared from a 1:1 mixture of urethane and $C_2F_6$.

EXAMPLE 3

10 g of untreated wool yarn and 10 g of polyamide material which have been subjected to a plasma pretreatment under the conditions described below are treated together in the same dyebath which contains 100 mg of a mixture of dyes existing of
C.I. Acid Black 207,
C.I. Acid Blue 317 and
C.I. Acid Blue 171,
100 mg of sodium acetate and
200 ml of water.

The pH is adjusted with acetic acid (80 %) to 4.5.

The dyebath is heated from 30° C. to 100° C. over 45 minutes and dyeing is carded out at boiling temperature for 60 minutes. The dyeing is finished in conventional manner. The material pretreated by the plasma is substantially undyed, whereas the untreated material is dyed in a deep grey shade.

The plasma pretreatment is carded out on both sides in succession under the following conditions:

frequency: 13.56 MHz
power: 150 Watt
pressure: 0.1 mbar
gas: $CH_4/C_2F_6$ 1:1
flow rate: 10 sccm/min
electrode spacing: 3 cm
treatment time: 120 seconds

EXAMPLE 4

5 g of a wool fabric is pretreated on both sides with a corona discharge of 600 Wmin/cm$^2$. The fabric thus pretreated as described in Example 1 is dyed together with 5 g of untreated fabric of the same quality simultaneously in the same bath. The corona-treated fabric is dyed dark blue, whereas the untreated fabric is dyed in a markedly lighter shade.

What is claimed is:

1. A process for producing textiles having a multicolor or tone-in-tone effect, which process comprises the steps of (a) partially covering a natural or synthetic polyamide fiber material with an adhesive tape or a screen, (b) subjecting the partially covered material to a plasma or a corona discharge treatment, (c) removing the adhesive tape or screen from the treated material, and (d) subsequently dyeing the treated, uncovered material with an anionic dye in the substantial absence of resist agents.

2. A process according to claim 1 wherein the treatment is a discharge treatment and a non-polymerising gas or a gas which imparts hydrophobic properties is present during the plasma discharge treatment.

3. A process according to claim 2, wherein the non-polymerising gas is selected from the group consisting of oxygen, nitrogen, argon, helium, hydrogen, ammonia and carbon dioxide and a mixture of such gases.

4. A process according to claim 3, wherein the gas is selected from the group consisting of oxygen, nitrogen, argon and air.

5. A process according to claim 2, wherein the gas which imparts hydrophobic properties is a fluorinated hydrocarbon.

6. A process according to claim 5, wherein the fluorinated hydrocarbon is $CF_4$ or $C_2F_6$.

7. A process according to claim 2, wherein the gas which imparts hydrophobic properties is a mixture of a fluorinated hydrocarbon and a hydrocarbon.

8. A process according to claim 7, wherein the gas which imparts hydrophobic properties is a mixture of methane or ethane and $CF_4$ or $C_2F_6$.

9. The fibre material treated by a process as claimed in claim 1.

10. A process of claim 2 wherein the plasma discharge treatment is carried out in a parallel plate reactor comprising a low-pressure reaction chamber, two parallel electrodes and a transmitter having a frequency of from 1 kHz to 3 GHz, wherein the non-polymerising gas or the gas which imparts hydrophobic properties flows through the reaction chamber at a flow rate of from 0.1 to 500 sccm/min, the material is placed in a space between the electrodes and from 1 to 100 kilowatts of electricity are applied at the electrodes.

11. A process of claim 10 wherein the flow rate is from 1 to 200 sccm/min.

12. A process of claim 10 wherein the space between the electrodes is from 1 to 30 cm.

13. A process of claim 10 wherein the pressure in the low-pressure reaction chamber is from $10^{-4}$ to 10 mbar.

14. A process of claim 10 wherein the material is subjected to the plasma discharge treatment for a period of from 0.1 seconds to 10 minutes.

15. A process of claim 10 wherein the non-polymerisable gas is oxygen, nitrogen, argon or a mixture thereof, the gas which imparts hydrophobic properties is $CH_4$, $CF_4$, $C_2F_6$ or a mixture thereof, the space between the electrodes is from 2 to 10 cm, the flow rate is from 1 to 200 sccrn/min, the pressure in the low-pressure reaction chamber is from $10^{-2}$ to 1 mbar and from 50 W to 2 KW of electricity is applied at the electrodes.

16. A process of claim 1 wherein the treatment is a corona discharge treatment.

17. A process of claim 16 wherein the treatment is carded out in ambient air under atmospheric pressure in an apparatus which comprises a discharge electrode, a grounded electrode and high-performance generator which produces a sinusoidal alternating voltage of 1 to 20 kV with a frequency of 10 to 40 kHz.

18. A process of claim 17 wherein a corona dose of from 100 to 3000 W.min/cm$^2$ is applied to the partially covered material.

19. A process of claim 18 wherein the corona dose is from 400 to 1000 W.min/cm$^2$.

* * * * *